United States Patent
Ohno et al.

(10) Patent No.: US 8,941,051 B2
(45) Date of Patent: Jan. 27, 2015

(54) PHOTOSENSOR FOR POSITION DETECTING DEVICE, POSITION DETECTING DEVICE USING SAME AND POSITION DETECTING METHOD

(75) Inventors: Fumiaki Ohno, Fujimino (JP); Kazuhito Fukui, Fujimino (JP)

(73) Assignee: New Japan Radio Co., Ltd., Tokyo (JP)

( * ) Notice: Subject to any disclaimer, the term of this patent is extended or adjusted under 35 U.S.C. 154(b) by 155 days.

(21) Appl. No.: 13/542,824

(22) Filed: Jul. 6, 2012

(65) Prior Publication Data
US 2013/0015336 A1 Jan. 17, 2013

(30) Foreign Application Priority Data

Jul. 13, 2011 (JP) ................................. 2011-155258
Oct. 31, 2011 (JP) ................................. 2011-238301

(51) Int. Cl.
*G01D 5/34* (2006.01)
*G01D 5/347* (2006.01)

(52) U.S. Cl.
CPC .................................. *G01D 5/34746* (2013.01)
USPC .................................. 250/231.13; 250/231.16

(58) Field of Classification Search
CPC ............................ G01D 5/347; G01D 5/34746
USPC ................ 250/231.16, 231.18, 237 R, 237 G, 250/231.13, 239; 356/614, 615, 616; 341/11, 13, 15
See application file for complete search history.

(56) References Cited

U.S. PATENT DOCUMENTS 7,391,011 B2 * 6/2008 Atsuta et al. ............. 250/231.18
8,013,596 B2 9/2011 Hoshino
(Continued)

FOREIGN PATENT DOCUMENTS

CN 101871792 A 10/2010
EP 2010501857 A 1/2010
(Continued)

OTHER PUBLICATIONS

First Office Action issued Aug. 4, 2014 by the State Intellectual Property Office of the People's Republic of China in counterpart application No. 201210238559.9 with English translation (in part).
(Continued)

*Primary Examiner* — Que T Le
*Assistant Examiner* — Don Williams
(74) *Attorney, Agent, or Firm* — Kratz, Quintos & Hanson, LLP

(57) ABSTRACT

An object of the present invention is to provide a position detecting device using a reflection type photosensor, which assures a small size and low cost and enables detection of a long distance of about 10 mm or more, and a position detecting method. The position of a moving body is detected by providing, on the moving body, a reflection plate (12) having reflecting surfaces (sa) and non-reflecting surfaces (sb) arranged alternately in a moving direction of the moving body, providing a light receiving element (8) of the reflection type photosensor (9) with, for example, two light receiving portions (8a and 8b) having different light receiving regions in the moving direction of the moving body, outputting output signals from these two light receiving portions (8a and 8b), and carrying out at least one calculation of adding, subtracting, dividing and function calculation of these two output signals.

5 Claims, 13 Drawing Sheets

(56) References Cited

U.S. PATENT DOCUMENTS

| | | | |
|---|---|---|---|
| 8,476,578 B2* | 7/2013 | Nakamura | 250/231.13 |
| 2010/0271711 A1 | 10/2010 | Yoshida et al. | |
| 2011/0147572 A1 | 6/2011 | Nakamura | |

FOREIGN PATENT DOCUMENTS

| | | |
|---|---|---|
| EP | 201118350 A | 6/2011 |
| JP | 4-9712 | 1/1992 |
| JP | 5-45179 | 2/1993 |
| JP | 11-194010 A | 7/1999 |
| JP | 2002-357762 A1 | 12/2002 |
| JP | 2006-173306 A1 | 6/2006 |
| JP | 2006-292396 A1 | 10/2006 |
| JP | 2009-38321 A1 | 2/2009 |
| WO | WO 2008/024606 A2 | 2/2008 |

OTHER PUBLICATIONS

Office Action dated Aug. 20, 2014 corresponding to Taiwan Patent Application No. 101121465.

* cited by examiner $D = (A' + C')/2$

MOVING DIRECTION

MOVING DIRECTION

PHOTOSENSOR FOR POSITION DETECTING DEVICE, POSITION DETECTING DEVICE USING SAME AND POSITION DETECTING METHOD

TECHNICAL FIELD

The present invention relates to a sensor using a reflection type photosensor for detecting a position and a moving distance of a moving body in an apparatus such as a camera, to a position detecting device using the sensor, and to a position detecting method.

BACKGROUND OF THE INVENTION

Various actuators have been used for driving lens, for example, in a digital still camera, a camcorder, a monitoring camera and the like, and in order to conduct sensing of a position of such movable lens, etc., a position detecting device is used.

For example, there are, as a device for detecting a position and a moving distance of focus lens, a device of a type using a pulse generator like a stepping motor system and a device of a type using a photosensor or a magnetic sensor for analogically detecting a moving distance in a piezo motor system. Examples of the former type are described in JP 04-9712 A, etc., and examples of the latter type are described in JP 05-45179 A, JP 2002-357762 A, JP 2006-173306 A, JP 2009-38321 A, etc.

The above-mentioned stepping motor system undergoes rotation for each of rotation angles corresponding to the number of counted pulses generated, and this stepping motor system is usually used for applications requiring long distance position detection. However, since a motor is not rotated continuously, noise during the rotation is large, which leads to generation of acoustic noise when taking a dynamic picture image, and moreover, there is a defect such as a delayed response.

For example, in a digital still camera, stepping motor systems have been mainly used so far. However, in order to place much importance on prevention of generation of acoustic noise when taking a dynamic picture image, increase in a speed of autofocus and down-sizing of an apparatus using a stepping motor system, recently piezo motor systems have been used, and for position detection by piezo motor systems, photosensors and magnetic sensors are used.

FIGS. 15A and 15B show a position detecting device with a reflection type photosensor which has been usually used so far. As shown in FIG. 15A, a reflection type photosensor 1 is configured such that a light emitting element 3 is disposed on one concave portion and a light receiving element 4 is disposed on another concave portion and the both portions are separated by a light-shielding wall 2. Also, as shown in FIG. 15B, a reflection plate 5 is provided at the side of a light emitting/light receiving surface SL of the photosensor 1 so as to be in parallel with the light emitting/light receiving surface SL and move in a direction of a line connecting the light emitting element 3 and the light receiving element 4. According to the configuration as mentioned above, light from the light emitting element 3 is reflected on the reflection plate 5 and is input into the light receiving element 4, and the position and the moving distance of the reflection plate 5 (a moving body to which the reflection plate is attached) are detected by the amount of received light.

In the position detection using such a reflection type photosensor, example of a technique for improving performance of position detection and moving distance detection is described in JP 2006-173306 A, and example of improvement in linearity of an output signal is described in JP 2009-38321 A.

SUMMARY OF THE INVENTION

Meanwhile, in a digital still camera, a single lens reflex camera, a camcorder, a monitoring camera and the like of high power or high-end models, for lens position detection of a camera module, in which zoom function and long distance detection are necessary, there is a case where long distance detection of not less than 10 mm with high resolution of not more than 5 μm is required, and actually such detection has been difficult in conventional position sensing using a reflection type photosensor.

On the other hand, in position detection of a piezo motor type for preventing acoustic noise when taking a photograph of a dynamic picture image, achieving high speed autofocus and down-sizing of an apparatus using a position detecting device, magnetic sensors are used. Example of a magnetic sensor is shown in JP 2006-292396 A. In this magnetic sensor of JP 2006-292396 A, a magnetic field generating member (magnet), in which S-poles and N-poles are arranged alternately, and two magnetic field detecting elements (MR element or hall element) are provided, and the position detection is carried out by amplifying outputs of the magnetic field detecting elements and conducting calculation thereof.

However, in the use of the above-mentioned magnetic sensor, there are the following problems.

1) A system itself becomes a large size.
2) A total system cost becomes high since a magnet (a magnetic field generating member), in which many S-poles and N-poles are arranged, is used.
3) It is difficult to improve linearity of a signal due to a configuration for detecting strength of a magnetic field.
4) In the case where another magnet is used in a device provided with a magnetic sensor or the like, there is a possibility of causing malfunction of the device due to an influence of interaction between the magnetic fields and the like.
5) Since outputs from the two magnetic field detecting elements are low, they need to be amplified using an operational amplifier, which leads to high cost of components constituting the system.
6) An error of a magnetic force in magnetizing of S-poles and N-poles of a magnet easily occurs, an intensity of a magnetic field is hardly kept constant, and performance is deteriorated due to oxidation of a magnet.

The present invention was made in the light of the above-mentioned problems, and an object of the present invention is to provide a sensor for a position detecting device using a reflection type photosensor, which assures a small size and low cost and enables detection of a long distance of 10 mm or more with resolution of 5 μm or less, without using a magnetic sensor which makes a size of a device large and causes a problem with detection accuracy, and a position detecting device using the sensor and a position detecting method.

In order to achieve the above-mentioned object, the sensor for the position detecting device according to the present invention is characterized by comprising: a reflection portion, on which reflecting surfaces and non-reflecting surfaces are arranged alternately in a moving direction of a moving body, and a reflection type photosensor facing the reflection portion and having a light emitting element for emitting light in the direction of the reflection portion and a light receiving element for receiving light reflected on the reflection portion, in which the light receiving element is provided with a plurality of light receiving portions having respective different light receiving regions in the moving direction of the moving body.

It is preferable that the light receiving portions of the light receiving element of the reflection type photosensor are formed so that an area per unit length of a light receiving region becomes larger in the moving direction of the reflection portion from the center toward both ends of the light receiving portion and a detected output changes linearly depending on a moving distance of the moving body, or a light emitting portion of the light emitting element is formed so that an area per unit length of a light emitting portion becomes larger in the moving direction of the reflection portion from the center toward both ends of the light emitting element and a detected output changes linearly depending on a moving distance of the reflection portion.

The position detecting device of the present invention has the sensor for position detection described in claim 1 and a calculating means undergoing at least one operation of function calculation, adding, subtracting and dividing by signals from the above-mentioned plurality of light receiving portions to linearize a relation of a value obtained by the operation with a position of the reflection portion.

In a relation of output values obtained from two of the plurality of light receiving portions with the position of the reflection portion, it is preferable that the position detecting device further comprises a neutral potential conversion means for parallel shifting of the output values so that a neutral potential of the output values fluctuating due to a change of the position of the reflection portion becomes zero, and that provided that the respective output values of the two light receiving portions converted with the neutral potential conversion means are A and B, the calculating means undergoes calculation of (A−B)/(A+B) in the case of A≥0 and B≥0 or A<0 and B<0 and calculation of (A+B)/(A−B) in the case of A≥0 and B<0 or A<0 and B≥0, since linearity is easily obtainable. Namely, the value of calculation in the form of triangular waveform, in which linear ascending inclined parts and descending inclined parts appear alternately, can be obtained, long-distance and high-accuracy position detection can be carried out, and an output fluctuation of the reflection type photosensor which is caused due to a change in temperature can be canceled.

The above-mentioned calculating means is further provided with a means for setting thresholds of an upper limit of an ascending curve and a lower limit of a descending curve which are limits for obtaining linearity of curves in a relation of a position of the reflection portion obtained from the two of the plurality of light receiving portions with the outputs of the respective light receiving portions and a counting means for counting the number of accesses to the thresholds of the upper limit and lower limit, thus enabling the position of the moving body to be detected by the number of counts obtained with the counting means and the outputs.

The position detecting device is further provided with a neutral potential conversion means for parallel shifting of output values so that neutral potentials of the respective sin θ curves become zero, when approximating a relation of the outputs obtained from the two of the plurality of light receiving portions with a position of the reflection portion by respective sin θ curves using a phase angle "θ" corresponding to a distance from a reference position, wherein the two light receiving portions are formed so that a phase difference between the two signals becomes 90 degrees, and calculation of θ=arctan(B/A) is carried out by the calculating means provided that output values from the two light receiving portions moved in parallel by the neutral potential conversion means are A and B and the output of the light receiving portion shifting forward by a phase difference of 90 degrees is A.

It is preferable that the position detecting device further comprises a neutral potential calculating means for calculating the neutral potential which adds the outputs of the two light receiving portions having a phase difference of 180 degrees, in which the plurality of the light receiving portions have a third light receiving portion which is formed so that a phase difference between the output of the third light receiving portion and the output of one of the two light receiving portions becomes 180 degrees.

The position detection method of the present invention is characterized by comprising: fixing, to a moving body, a reflection portion on which reflecting surfaces and non-reflecting surfaces having the same width are arranged alternately in a moving direction of a moving body; providing the reflection type photosensor having a light emitting element and a light receiving element opposite to the reflection portion; forming the light receiving element of the reflection type photo sensor so as to have a plurality of different light receiving portions along the moving direction of the moving body; and conducting calculation of the outputs of the plurality of light receiving portions, which change according to the movement of the moving body, thereby detecting the position of the moving body.

According to the configuration of the present invention, output signals being close to a sine curve are obtained depending on a distance and two signals having different phases having a periodic function being close to a sine curve are output from the two light receiving portions by fitting a reflection portion having reflecting surfaces and non-reflecting surfaces formed alternately thereon to a moving body, for example, a movable lens of a camera, etc. and by receiving light reflected from the reflection portion with, for example, two light receiving portions (having respective different light receiving regions). A position or a moving distance of the moving body can be detected by carrying out calculation of linear values based on these two signals (calculation for obtaining values having linearity) or by integrating the values at linear portions of the two changing signals. Here, the calculation of linear values means a calculation for obtaining values from the light receiving portion which make the relation between the position of the moving body and the values obtained from the light receiving portion become close to a straight line, wherein the values from the light receiving portion which are approximate to such a relation giving linearity are simply called "linear values" hereinafter, and the calculation for obtaining such linear values are simply called "calculation of linear values" hereinafter.

Moreover, for example, linearity of the two signals can be enhanced by using a reflection type photosensor provided with a light receiving region or a light emitting region whose area per unit length becomes larger from the center in the moving direction of the reflection portion toward both ends so that a detected output changes linearly according to a moving distance of the reflection portion.

Further, for example, by outputting three signals (outputs A to C) from the light receiving portions divided into three, calculating a neutral potential from the two output signals A and C having a phase difference of 180 degrees between them, and carrying out calculation of linear values using the output signals A and B having a phase difference of 90 degrees between them, the neutral potential can be obtained at the same time as the calculation of linear values, and a position and a moving distance of the moving body can be detected accurately while the neutral potential is kept constant even if the output signals fluctuate due to a change in temperature.

EFFECT OF THE INVENTION

According to the position detecting device of the present invention, the reflection portion is configured simply such that reflecting surfaces and non-reflecting surfaces are alternately arranged thereon, and therefore, as compared with a magnetic field generating member having many of S-poles and N-poles arranged thereon, a sensor assuring a low cost and a small size can be formed, and enhancement of linear characteristic is easy. Moreover, by forming many of reflecting surfaces and non-reflecting surfaces repeatedly, good position sensing can be made possible over a long distance of 10 mm or more. Furthermore, high resolution (high accuracy) position detection of 5 µm or less can be realized by adjusting widths of the reflecting surfaces and non-reflecting surfaces to be small to increase an output gradient. For example, when the widths of the reflecting surfaces and non-reflecting surfaces are 300 µm each, a phase change of 180 degrees/30=6 degrees must be discriminated for detecting a change of 10 µm. Meanwhile, when the widths of the reflecting surfaces and non-reflecting surfaces are 100 µm each, a phase change of 180 degrees/10=18 degrees may be detected for detecting a change of 10 and since a change of about 10 degrees can be detected sufficiently, high resolution of 5 µm or less can be achieved. Accordingly, there is an effect of making it possible to apply the position detecting device to camera modules requiring a zoom function such as a digital still camera, a single lens reflex camera, a camcorder, a monitoring camera and the like of high power or high-end module requiring position detection of 10 mm or more and also to applications requiring long-distance and high-accuracy position detection.

Moreover, defects caused when using a magnetic sensor are eliminated. Namely, there is no influence of interaction between the magnetic fields, a detection error due to non-uniformity in magnetizing S-pole and N-pole of a magnet or a non-uniform magnetic field strength is prevented from being generated, and deterioration of performance due to oxidation of a magnet is prevented.

Further, by shielding a part of the light receiving region at the central part of the light receiving portion from light, linearity of an ascending gradient and a descending gradient of an output waveform from the light receiving portion can be improved, and detection accuracy can be increased.

Further, by carrying out calculation for adding and subtracting outputs from the two light receiving portions formed in different regions and calculating a ratio of the obtained sum and difference, a curve exhibiting a calculation result having good linearity can be obtained.

By calculating a neutral potential by providing the above-mentioned third light receiving portion having a phase difference of 180 degrees, the neutral potential being indispensable for obtaining linear characteristic essential for long-distance position detection can be taken out at the same time as the position detection, and there is an advantage such that in the case where the photosensor has temperature dependence or a fluctuation of an output signal from the photosensor is generated due to a change in temperature, even if a neutral potential level changes, it does not give an effect on the results (linear characteristic) obtained from the calculation equation.

BRIEF DESCRIPTION OF THE DRAWINGS

FIGS. 15A and 15B show a configuration of a conventional position detecting device, in which FIG. 15A is a top view and FIG. 15B is a side view.

DETAILED DESCRIPTION

Figure 1:
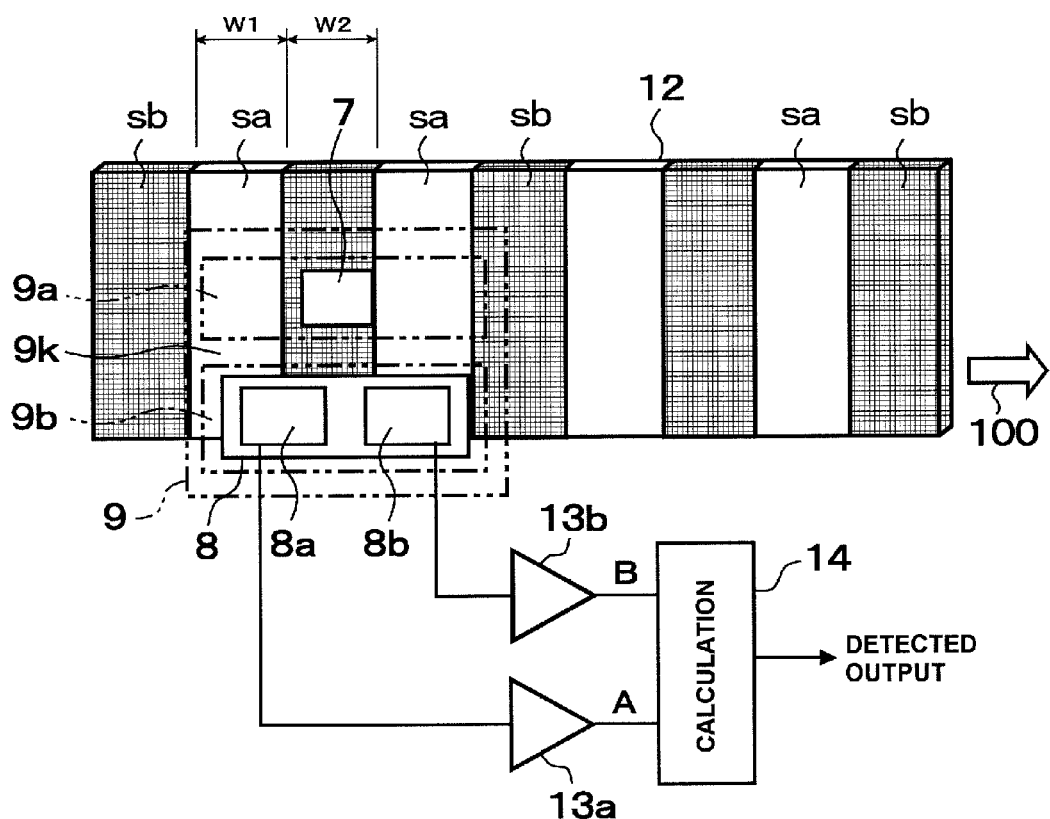
FIG. 1 shows a configuration of a position detecting device using a reflection type photosensor according to Example 1 of the present invention.

FIGS. 1 to 3B show a configuration of a position detecting device using a reflection type photosensor according to Example 1 of the present invention, and in this Example, a reflection type photosensor 9 having a light emitting element 7 and a light receiving element 8 is provided. In other words, as shown in FIG. 3A, this reflection type photosensor 9 is configured such that the light emitting element (LED) 7 is arranged in one concave portion 9a partitioned with an outer peripheral wall and a light-shielding wall 9k and the light receiving element (photo transistor) 8 is arranged in another concave portion 9b. In this configuration, a reflection plate (optical reflection portion) 12 is arranged at the side of a light-emitting/light-receiving surface of the photosensor 9 so as to move in a direction 100 being parallel to the light-emitting/light-receiving surface and being approximately vertical to an arranging direction (longitudinal direction in the figure) of the light emitting element 7 and the light receiving element 8. This reflection plate 12 is mounted on a moving body such as a lens so as to move together with it.

On the reflection plate 12, reflecting surfaces "sa" and non-reflecting surfaces "sb" in the form of extra fine stripe are formed alternately (in the form of vertical stripes), and in Examples, the width "w1" of the reflecting surface "sa" and the width "w2" of the non-reflecting surface "sb" are equal (w) to each other and "w" is approximately 300 μm. In other words, it is preferable that the reflecting surface "sa" and the non-reflecting surface "sb" have the same width. Further, it is preferable that this width is as narrow as possible from the viewpoint of improving detection accuracy (sensitivity). The non-reflecting surfaces "sb" may be spaces in the form of slit. This reflection plate 12 can be formed easily and highly accurately by metal deposition or sputtering on a transparent glass using usual photolithographic technique for semiconductor. Moreover, in the case of using a resin as a substrate, the reflection plate 12 can be formed by partial surface roughening by etching or embossing at molding in addition to metal plating.

Figure 2A:
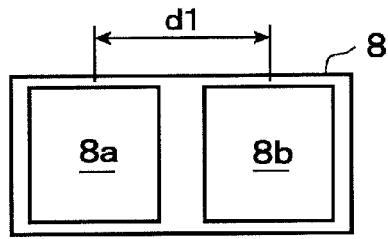
FIGS. 2A to 2D show examples of structures of a light receiving portion.
Figure 2B:
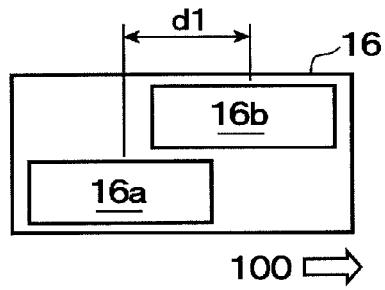

As shown in FIG. 2A, two light receiving portions 8a and 8b divided to give different light receiving regions in the moving direction of the moving body are formed on the light receiving element 8 of the photosensor 9. In Examples of the present invention, as shown in FIGS. 2A and 2B, a center-to-center distance "d1" of 8a and 8b and also 16a and 16b is set to be w/2 usually so as to give a phase difference of 90 degrees, but is not always w/2 and depends on a shape of the light receiving portions 8a and 8b. The two light receiving portions 8a and 8b are formed so as to have the same area and the same shape. The purpose of this is, as explained infra, to make the outputs of the light receiving portions 8a and 8b to change in the same way by the movement of the reflection plate 12 and to give the phase difference of 90 degrees. However, even if the phase difference is not 90 degrees, it is not necessary to make such a limitation as mentioned above, if the calculation enabling linearity to be obtained can be carried out by adjusting the calculating means as explained infra.

Furthermore, in Example 1, the position detecting device is provided with buffer amplifiers 13a and 13b receiving the outputs from the two light receiving portions 8a and 8b of the light receiving element 8 and a calculating means (MPU) 14 undergoing calculation of linear values from the outputs of the buffer amplifiers 13a and 13b. This calculating means 14 may undergo a calculation with a micro processor or may be an operational amplifier circuit. The position detecting device also has a neutral potential conversion means, not shown in the figures, for obtaining a neutral potential of changing outputs of the two light receiving portions 8a and 8b while the reflection plate 12 is moving, and the neutral potential conversion means conducts conversion to the changing outputs provided that the neutral potential is zero.

This neutral potential conversion means can make the neutral potential zero by a method of converting the outputs into digital values, for example, with an ADC, determining neutral potentials with a microcomputer and subtracting the neutral potentials from the outputs obtained from the light receiving portions 8a and 8b, or by carrying out offset processing by making a DC level zero with an amplifier 13a or 13b. Provided that the output values from the two light receiving portions 8a and 8b, in which the neutral potentials are converted to zero, are represented by A and B, by calculating $b=(A-B)/(A+B)$ in the case of $A \geq 0$ and $B \geq 0$ or $A<0$ and $B<0$ and $a=(A+B)/(A-B)$ in the case of $A \geq 0$ and $B<0$ or $A<0$ and $B \geq 0$, outputs in the form of triangular waveform, in which linear ascending lines and linear descending lines appear repeatedly as the reflection plate 12 moves, are obtained. Even if a fluctuation of the outputs arises due to thermal property of the reflection type photosensor, the fluctuation is canceled by carrying out the calculation with an equation containing the measured values of the same order in both of a denominator and a numerator because the same change occurs in a denominator and a numerator.

Figure 2C:
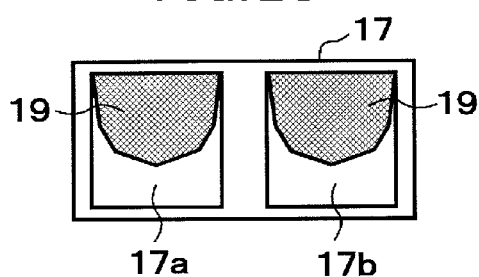
Figure 2D:
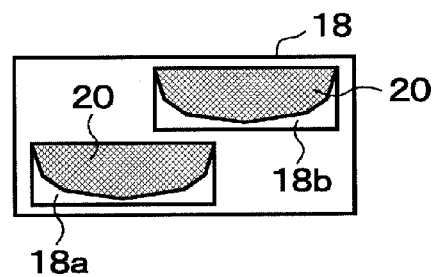
Figure 3A:
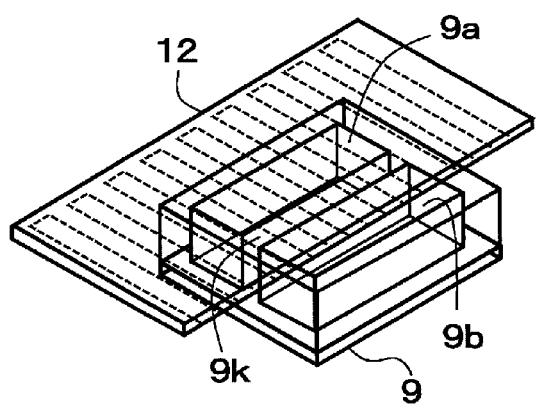
FIGS. 3A and 3B show perspective views of a position detecting device of Example 1 shown in FIG. 1, as seen from the reflection portion side and a perspective view as seen from the photosensor side, respectively.
Figure 3B:
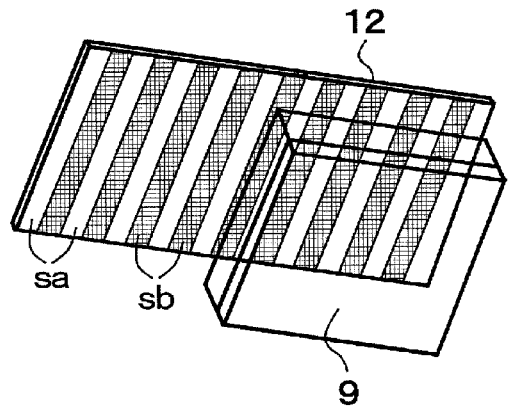

In FIGS. 2B to 2D, examples of other configurations replacing the light receiving element 8 are represented. In FIG. 1, a perspective view, in which the reflection type photosensor 9 is seen from the back side, is drawn, and in FIGS. 2A to 2D, the front view of the photosensor 9 is drawn. In the light receiving element 16 of FIG. 2B, the two light receiving portions 16a and 16b of the light receiving regions formed long and narrowly in the moving direction 100 of the moving body are arranged in a vertical direction to the moving direction 100 with the both light receiving portions being in a partly overlapped state. Even in this case, similarly to the configuration as mentioned above, the center-to-center distance "d1" of the two light receiving portions 16a and 16b is formed so that the outputs therefrom give a phase difference of 90 degrees. The light receiving element 17 of FIG. 2C has light receiving portions 17a and 17b which are formed by shielding a part of the light receiving portions 8a and 8b of FIG. 2A with light-shielding reflection films 19. The light receiving element 18 of FIG. 2D has light receiving portions 18a and 18b which are formed by shielding a part of the light receiving portions 16a and 16b of FIG. 2B with light-shielding reflection films 20. The above-mentioned light-shielding reflection films 19 and 20 have a polygonal profile and may be in the curved form. The profile of the light-shielding reflection films can be optionally selected according to a required output characteristic.

Namely, like the light receiving portions described in the above-mentioned JP 2009-38321 A, these light receiving portions 17a, 17b, 18a and 18b are provided with the respective light receiving regions, areas per unit length of which become larger from the center portion in the moving direction of the reflection plate 12 to both ends by covering active layers (light receiving regions) of the light receiving portions 8a, 8b, 16a and 16b, respectively with the light-shielding reflection films (Al films) 19 and 20. By these configurations, linearity of detected outputs of the photosensor 9 can be improved. In Examples, two each of the light receiving portions are formed in the respective light receiving elements 8 and 16 to 18. However, two each of the light receiving portions 8a and 8b, 16a and 16b, 17a and 17b and 18a and 18b may be arranged separately as light receiving elements.

On the other hand, also in the light emitting region of the light emitting element 7, linearity of detected outputs of the photosensor 9 can be improved by covering a part of the light emitting region with light-shielding films and forming light emitting regions, an area per unit length of which becomes larger from the center portion in the moving direction of the reflection plate 12 to both ends, in the same manner as in the above-mentioned light receiving elements 17 and 18.

Figure 4A:
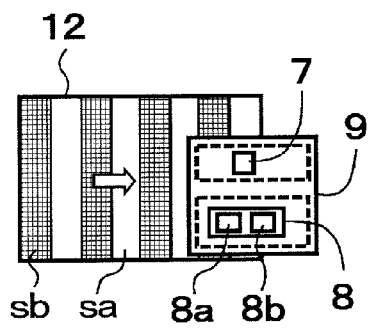
FIG. 4A shows an example of detection with a position detecting device of Example 1.
Figure 4B:
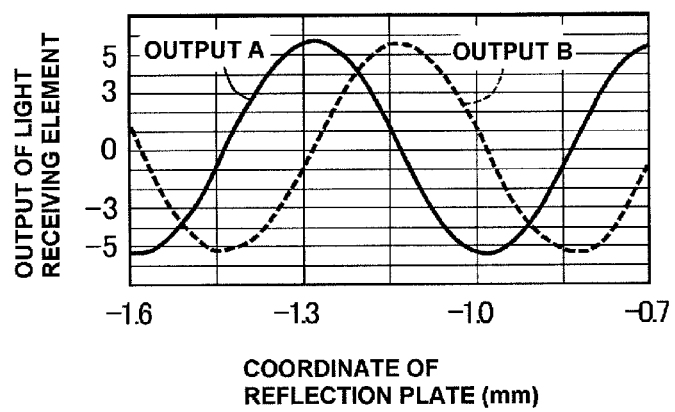
FIG. 4B is a simulation graph of an output of a light receiving element when the neutral potential is zero.
Figure 4C:
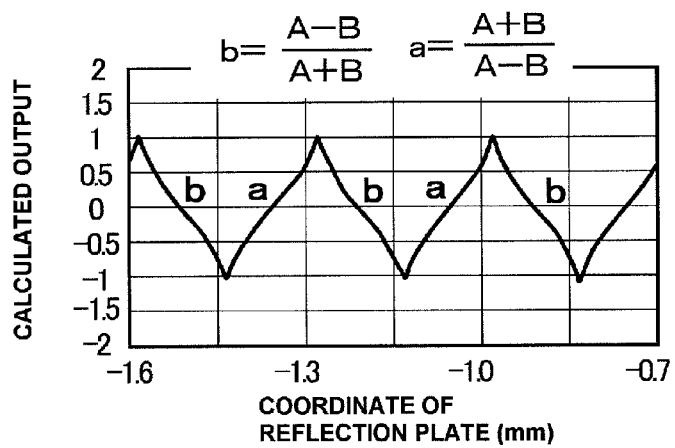
FIG. 4C is a graph showing the result of a calculating means for obtaining linearity (calculation outputs of linear values).

Example 1 is so configured as mentioned above, and according to such a configuration, the results shown in FIG. 4 can be obtained. In other words, in the configuration of Example 1 shown in FIG. 4A, a relative output A is obtained from the light receiving portion 8a of the light receiving element 8 and a relative output B is obtained from the light receiving portion 8b as shown in FIG. 4B when the neutral potential is converted to zero. These outputs A and B give a waveform showing a phase difference of 90 degrees (nearly corresponds to an interval of 0.15 mm). Then, by calculating $b=(A-B)/(A+B)$ and $a=(A+B)/(A-B)$ based on these outputs A and B with the calculating means 14 depending on plus or minus of the outputs A and B, a triangular waveform, in which ascending inclined parts "a" and descending inclined parts "b" are repeated to the coordinate of the reflection plate, is obtained, as shown in FIG. 4C. Namely, a detected output giving maintained linearity can be obtained.

This relation between the coordinate of the reflection plate and the outputs A and B is determined unambiguously if a correlation between the reflection plate 12 (reflection portion) and the reflection type photosensor 9 is determined. Therefore, at the time when the position detecting device is formed, the relation of the calculated outputs with the coordinate of the reflection plate as shown in FIG. 4C is previously known and the relation of the number of triangular waves with the coordinate of the reflection plate based on the calculation outputs is recorded in a memory. As a result, an actual position of the reflection plate 12 can be detected by comparing the reference values memorized in the memory with the calculated outputs measured by the light receiving portions 8a and 8b and the values obtained by counting how many times the reflection plate 12 has passed the linear portions of "a" and "b" until the measurement is made.

In addition, by using the above-mentioned calculation equations, it is possible to completely cancel thermal property of the reflection type photosensor 9. In other words, for example, when there is no influence of temperature, A=0.4 (V) and B=0.1(V), a value obtained by the above-mentioned calculation equation $(A-B)/(A+B)$ is 0.6. On the other hand, when there is a fluctuation of 10 percent due to an influence of temperature, A=0.44 and B=0.11, however, also in this case, a calculated value becomes 0.6 and thus, the fluctuation is canceled. Therefore, there is no need of providing a circuit for monitoring a temperature inside the device with a thermistor and carrying out feedback thereof or a specific thermal property canceling circuit. In addition, since the light receiving element 8 is formed so that an interval between the two light receiving portions 8a and 8b gives a phase difference of 90 degrees, provided that a change of the output signal of the output B having a delayed phase and subjected to correction of the neutral potential is approximate to a $\sin \theta$ curve, an output signal of A is $\sin(\theta+90°)$, and therefore, it is possible to consider a method of calculating a moving distance by calculating $\theta$ from $\theta=\arctan(B/A)$ which is an inverse function of a ratio of output signals, i.e., $B/A=\sin(\theta)/\cos(\theta)=\tan(\theta)$ to obtain a correlation between a pitch of the reflecting surface (or the non-reflecting surface) of the reflection plate 12 and the angle "$\theta$". However, compared with this method, the moving distance can be calculated easily by the use of the above-mentioned calculation equation for obtaining "$\theta$". When linearity is not sufficient in the case of the above-mentioned calculation equation for obtaining "a" and "b", better linearity can be obtained by the use of this method for obtaining "$\theta$".

In this case for obtaining "$\theta$", too, in the same manner as in the case of obtaining "a" and "b", if a correlation between the reflection plate 12 and the reflection type photosensor 9 is determined, the relation between the coordinate of the reflection plate 12 and the angle "$\theta$" is previously known and is memorized in the memory, and an actual position of the reflection plate 12 can be obtained, in the same manner as above, from how many times $\tan(\theta)$ curve has been rotated (how many times the curve has passed the reflection portion "sa") and the above-mentioned "$\theta$" obtained by the calculation of a function. Further, by memorizing a relation of a position with $x=w\cdot\theta/\pi$ obtained by converting "$\theta$" with a function of a width "w" of the reflecting surface "sa" without memorizing a relation of a position with "$\theta$", the actual position can be obtained from this value "x".

Figure 5A:
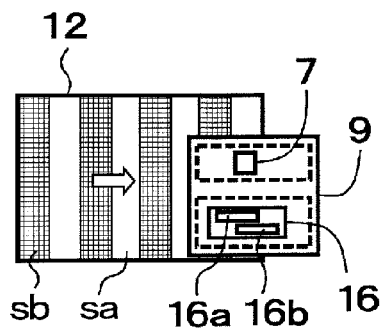
FIGS. 5A to 5C show the configuration of the light receiving portion shown in FIG. 2B and show the result obtained by processing in the same manner as in FIGS. 4A to 4C.
Figure 5B:
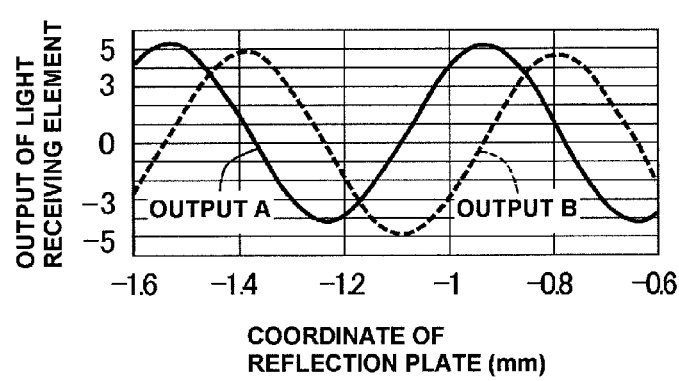
Figure 5C:
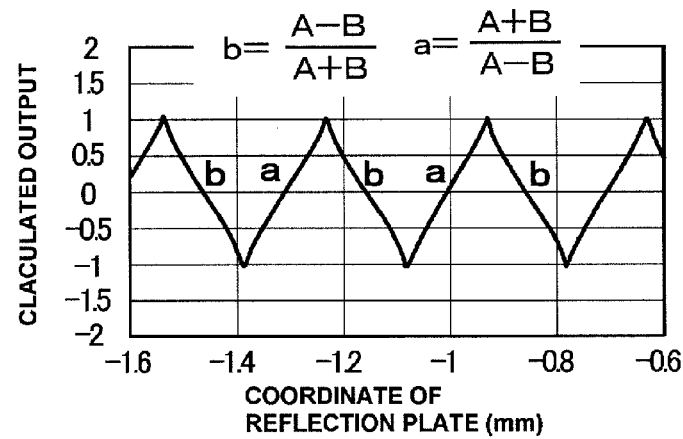

FIGS. 5A to 5C show the results of the case of using the light receiving element 16 of FIG. 2B. In this case, as shown by the output A when the neutral potential is adjusted to zero with the light receiving portion 16a of the light receiving element 16 and the output B when the neutral potential is adjusted to zero with the light receiving portion 16b, outputs of a waveform having a phase difference of 90 degrees can be obtained between the both outputs. Then, by calculating $b=(A-B)/(A+B)$ and $a=(A+B)/(A-B)$ with the calculating means 14 (see FIG. 1) using a micro computer based on these outputs A and B in the same manner as in the example of FIG. 1, a triangular waveform having maintained linearity and formed by "a" and "b" as shown in FIG. 5C is obtained.

Figure 6:
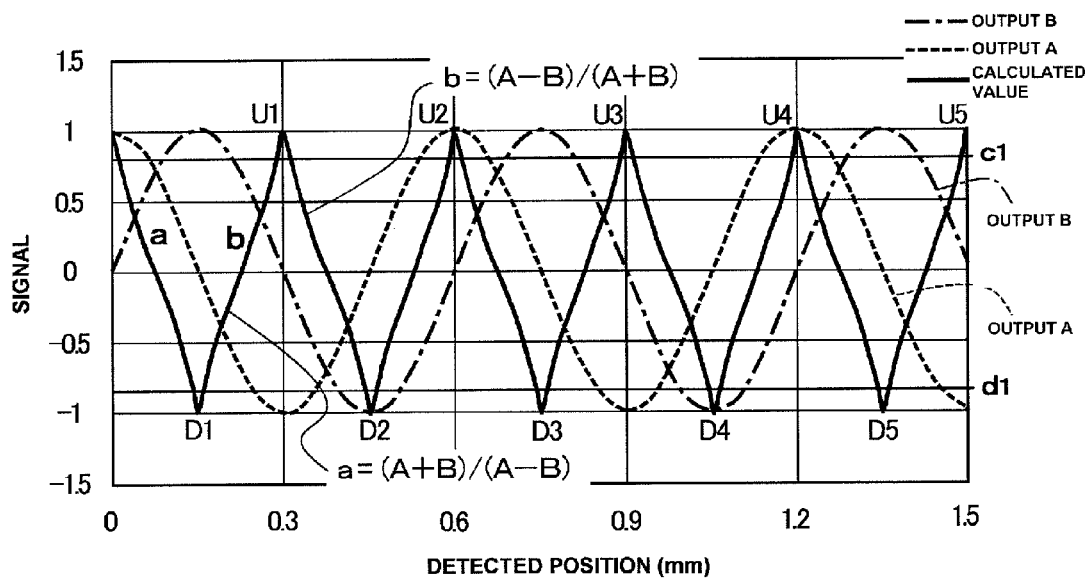
FIG. 6 is a graph made by overlapping FIGS. 4B and 4C and showing extreme values of the outputs of the light receiving element by ±1.

FIG. 6 shows both of the outputs from the light receiving element 8 and the calculation outputs of linear values of Example 1, and the calculation values "a" and "b" form triangular waveforms which are repeated according to the moving distance (detected position) of the reflection plate 12. In this Example, one triangular waveform corresponds to the moving distance of 0.3 mm.

In this Example, since the triangular waveform is repeated in a period of 0.3 mm, for example, the calculated value at 0.15 mm (minimum point D1) is the same as that at 0.45 mm (minimum point D2), and therefore, at which position the reflection plate is located cannot be determined. Thus, due to this periodicity, the calculation result is the same at the position "x" and the position of (x+0.3) mm. However, since in a period of 0 to 0.3 mm, a relation of the calculated value "a" or "b" to the position of the reflection plate is 1:1, the position of the reflection plate can be determined from the calculated value in consideration of how many times the reflection plate passes the maximum point and the minimum point.

Namely, receiving of a signal and calculation are always conducted during the moving of the reflection plate 12. Therefore, by counting how many times the reflection plate has passed the minimum point and recording the counting results, the position of the reflection plate can be calculated and determined by an equation of "the present position=(the position corresponding to the calculated value "a" (within 0.3 mm))+(period of signal (0.3 mm)×counted number)". The maximum points U1, U2 . . . and the minimum points D1, D2 . . . are positive-negative change-over points of the signals A and B. The minimum points are points where the signal A changes over from positive to negative or from negative to positive, and the maximum points are points where the signal B changes over from positive to negative or from negative to positive. This change-over of the signals can be detected with an analog comparator based on a zero point or can be detected by determining with a processor whether the digital value after conversion to digital is positive or negative.

Therefore, in the case where the position detecting device of this Example is applied to a camera module having a zoom function, by designing a lens so as to return to a starting point when finishing or starting the use of a camera (a zoom lens is in a state of being stored), a moving distance of a lens according to a zooming action can be known by integrated counts when using a zoom function, and a present position of a lens can be known by memorizing integrated counts in a memory at the time of completion of a zooming action. Moreover, reaching of a lens to a maximum movable position can be known by changing a size of the reflecting surface "sa" of the reflection plate 12 only at an end portion to be larger, thus making output waveforms only at an end portion of the light receiving elements 8 and 16 to 18 being different from those of other portions.

Moreover, in the present invention, since an amount of change in "a" and "b" (a change in unit moving distance) for a moving distance of the moving body can be made large, very high resolution position detection becomes possible. In other words, in the case where higher resolution detection needs to be carried out, angles of ascending inclined lines and descending inclined lines of the output waveform of the light receiving portion may be adjusted to be large by optimum designing of a light receiving pattern (shape, dimension, arrangement, etc. of two light receiving portions) and a configuration of the reflection plate 12 (widths of the reflecting surface and non-reflecting surface, etc.) so as to increase changes in the calculated values "a" and "b" in the waveform of calculated value of FIG. 6. As a result, the gradients (amounts of change of "a" and "b" to the moving distance) of the calculated values "a" and "b" of the two output signals of the reflection type photosensor 9 increase, and high resolution can be obtained. In FIG. 6, when using the calculated values "a" and "b", detection accuracy can be improved by setting upper and lower thresholds c1 and d1 and using the calculated values "a" and "b" between these thresholds c1 and d1.

Figure 7:
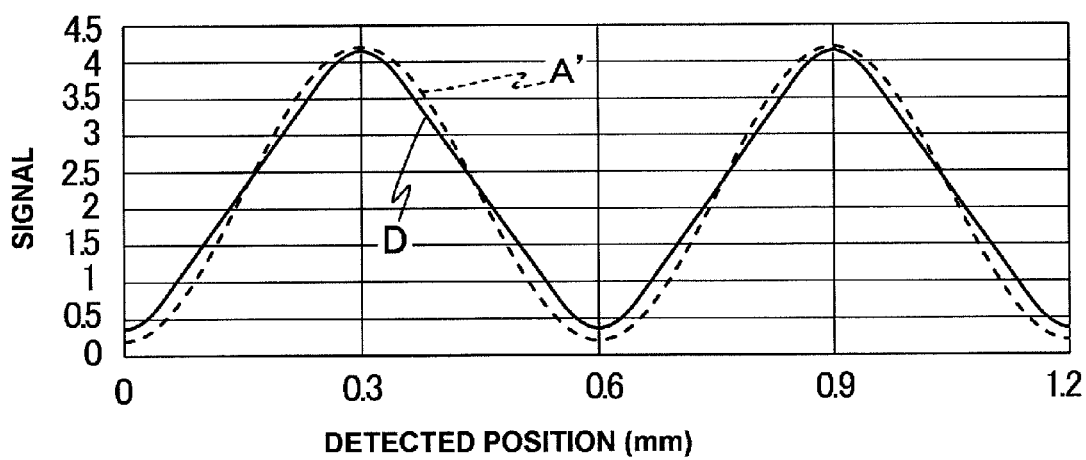
FIG. 7 is a graph showing outputs of the light receiving portion in the case where a part of a light receiving region is shielded like FIGS. 2C and 2D in Example 1.

FIG. 7 shows the output D from the light receiving portion 17a as a representative of 17a, 17b, 18a and 18b in the case of partly shielding the light receiving regions of the two light receiving portions in Example 1 (FIGS. 2C and 2D). In this case, as shown therein, improvement of linearity of the output waveform can be confirmed at the maximum point and minimum point sides as compared with A' of FIG. 2A. Namely, linearity of the inclined lines of the output waveform in the neighborhood of an extreme value can be improved by covering a part of the light receiving regions of the light receiving portions 17a, 17b, 18a and 18b with light-shielding films 19 and 20 as shown in FIGS. 2C and 2D and forming the light emitting region, an area per unit length of which becomes larger from the center portion in the moving direction of the reflection portion to both ends.

Figure 8A:
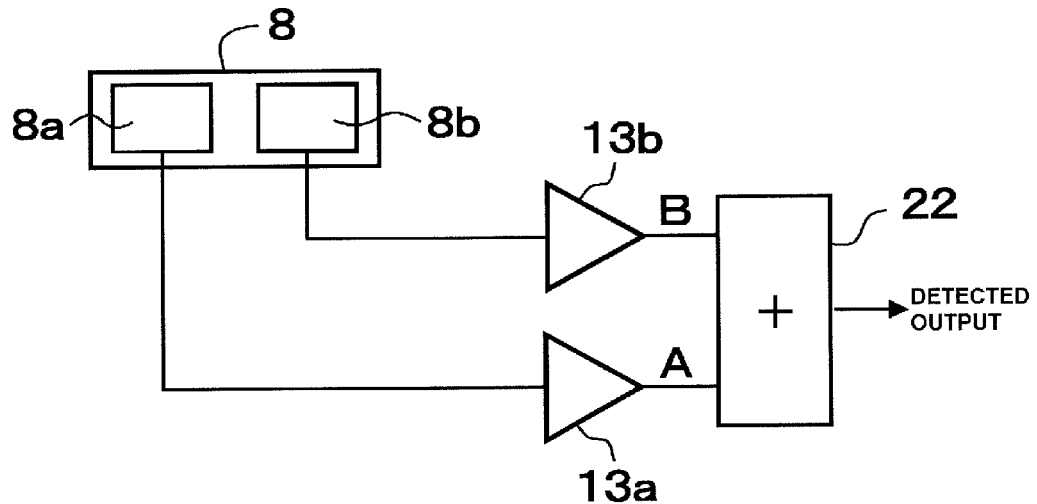
FIGS. 8A and 8B are explanatory views showing a configuration of a position detecting device of Example 2 and showing outputs of a light receiving element and an example of detection thereof.
Figure 8B:
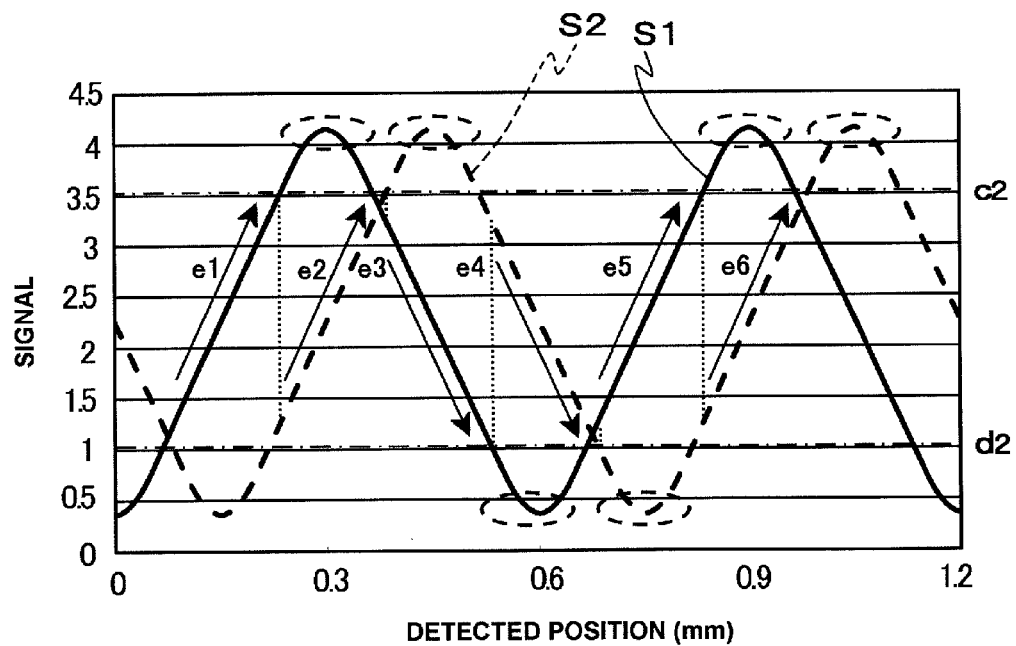

FIGS. 8A and 8B show a configuration of Example 2, and in this Example 2, long distance detection is carried out without calculation of linear values. Namely, as shown in FIG. 8B, in the elliptic portions marked with a dotted line in the neighborhood of extreme values of output waveforms (maximum point and minimum point portions), a change in an output signal is small and accurate position detection cannot be carried out, but the waveform at the portions other than the elliptic portions have linearity and the position is detected by making use of the linear portions. In other words, though continuous position detection cannot be carried out only by a signal from one light receiving portion, as shown in FIG. 8A, by arranging the two light receiving portions 8a and 8b so that the signal S1 and the signal S2 having a phase difference, for example, 90 degrees can be obtained and by using the linear portions of the both signals S1 and S2 alternately, the position can be detected. In this case, the phase difference between the two light receiving portions 8a and 8b is not necessarily limited to 90 degrees, and the phases thereof are deviated so that the extreme value portions of the both signals S1 and S2 are not overlapped and the extreme value portions of the signal S1 is compensated by the linear portions of the signal S2.

The position detection method of this Example is explained by means of FIG. 8B. Thresholds d2 (lower limit) and c2 (upper limit) showing a range where linearity of the signals S1 and S2 can be obtained are previously set. In the change e1 shown in FIG. 8B, the position detection is carried out with the signal S1, and when the output of the signal S1 has reached the upper limit threshold c2, the position detection is carried out with the output of the signal S2 (e2). Similarly, when the output of the signal S2 has reached the upper limit threshold c2, the position detection is carried out with the output of the signal S1 (e3). In the same manner, when the output of the signal S1 has reached the lower limit threshold d2, the output is changed over to the output of the signal S2 for the position detection. Thus by repeating these operations, even the long distance position can be detected accurately. In this Example, too, if the positions of the light receiving portions 8a and 8b are determined, the relation between the detected position and the output values of signals is always constant. Therefore, even the long distance position can be detected surely by previously memorizing a relation of the output values of the two signals to the distance and counting, with an adding circuit 22, how many times the two signals S1 and S2 have passed the upper limit threshold c2 and the lower limit threshold d2. Whether or not the signal has passed the threshold can be detected with a comparator based on a threshold or a detection means for comparing digital values in a processor. By this method, a calculating means for calculating linear values is unnecessary, and position detection can be carried out with a simple configuration.

In the above Example, the examples of dividing the light receiving regions of the light receiving elements 8 and 16 to 18 into two parts each are explained. Further, long distance position detection with high resolution may be carried out by dividing each of the light receiving regions of the light receiving element into three parts or more, and then executing calculation of linear values based on three or more outputs in Example 1 and integrating three or more outputs in Example 2.

Next, Example 3 is explained below.

In the above-mentioned Examples, when carrying out the calculation of linear values, calculation processing based on a neutral potential of output signals from the light receiving portions is necessary. However, since an output voltage of the photosensor 9 has temperature dependence, the neutral potential level changes due to a change in temperature, and if the calculation is carried out in a state of offset (fluctuation) being generated on the neutral potential, linearity of a relation between the value obtained from the calculation and the distance is deteriorated.

The conditions for obtaining normal linearity are established by adding maximum values and minimum values with respect to the respective output A and output B of the two light receiving portions 8a and 8b of the photosensor 9, dividing the obtained values by ½ to obtain the respective neutral potentials of the outputs A and B, and using the obtained neutral potentials as offset values (fluctuation of DC level) of the respective outputs to correct the neutral potentials. However, when an abrupt change of the output signals of the reflection type photosensor 9 occurs due to an abrupt change of an ambient temperature, there arises, depending on the timing, a case where a normal neutral potential (for example, zero) to be essentially given in the calculation equation is not used, thereby resulting in a possibility of deteriorating linearity. Therefore, in Example 3, a neutral potential is calculated and calculation of linear value is carried out based on the obtained neutral potential.

Figure 9:
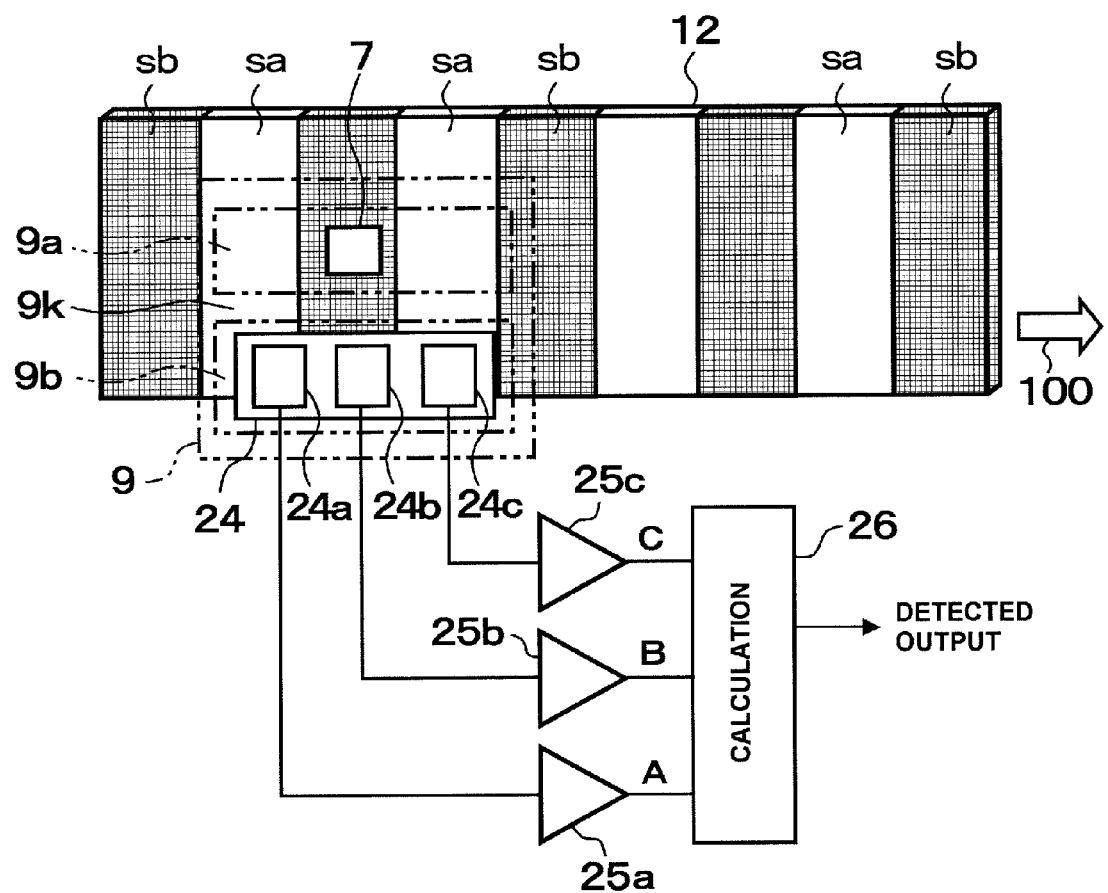
FIG. 9 shows a configuration of a position detecting device of Example 3.
Figure 10A:
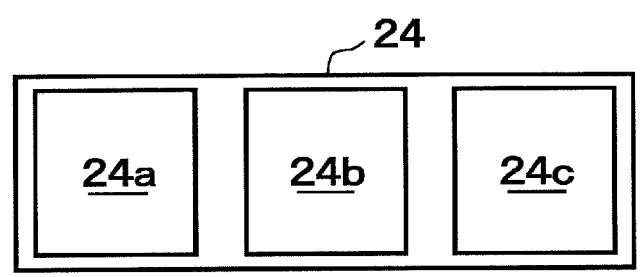
FIGS. 10A and 10B show a configuration of a light receiving element of Example 3.
Figure 10B:
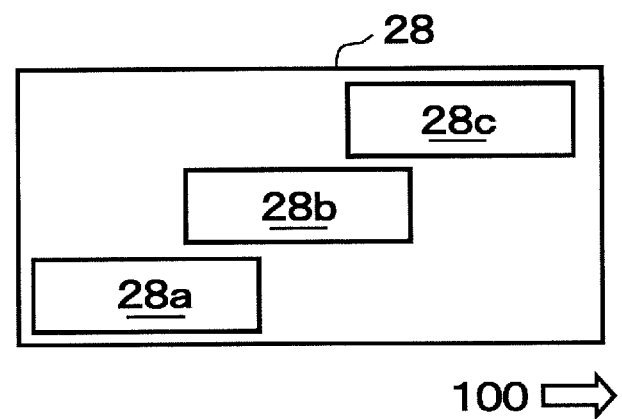

FIGS. 9, 10A and 10B show a configuration of the position detecting device of Example 3. In this Example, the same reflection plate 12 (w1=w2=w) as in Example 1 is disposed, and the reflection type photo sensor 9 having the light emitting element 7 and the light receiving element 24 is provided. Namely, this reflection type photosensor 9 is composed of the same configuration as in Example 1, and the light receiving element 24 is arranged instead of the light receiving element 8. In this light receiving element 24, as shown in FIG. 10A, three light receiving portions 24a, 24b and 24c divided so as to give different light receiving regions in the moving direction 100 of the moving body are formed, and the device is so designed that by adjusting the respective intervals between the centers of the three light receiving portions 24a, 24b and 24c so that the respective outputs have a phase difference of 90 degrees, the three output signals (A to C) from the photosensor 9 have a correlation such that, for example, a phase angle is delayed by 90 degrees (output B) and 180 degrees (output C) to the reference signal (0 degree: output A).

Moreover, the device is provided with the buffer amplifiers 25a, 25b and 25c for receiving the outputs from the above-mentioned three light receiving portions 24a, 24b and 24c, and the calculating means (MPU) 26 for obtaining a neutral potential of the detection signals from the outputs of the buffer amplifiers 25a, 25b and 25c and also carrying out calculation of linear values. The calculation of linear values with this calculating means 26 can be applied to the calculations of b=(A−B)/(A+B) and a=(A+B)/(A−B) and the calculation for approximating this output to the sin wave curve and obtaining a phase angle "θ" of the signal with θ=arctan(B/A), similarly to Example 1. In this case, the neutral potential is obtained by offsetting the value resulting from the addition of the outputs from the amplifiers 25a and 25c to be zero.

FIG. 10B shows another example of a configuration replacing the above-mentioned light receiving element 24. The configuration of the light receiving element 28 of FIG. 10B is such that the light receiving portions 28a, 28b and 28c of the light receiving regions formed long and narrowly in the moving direction 100 of the moving body are arranged in a vertical direction to the moving direction 100 with these light receiving portions being in a partly overlapped state. In the above-mentioned light receiving portions 24a, 24b and 24c and light receiving portions 28a, 28b and 28c, the light-shielding reflection film 19 explained in FIGS. 2C and 2D can be provided thereon.

Figure 11A:
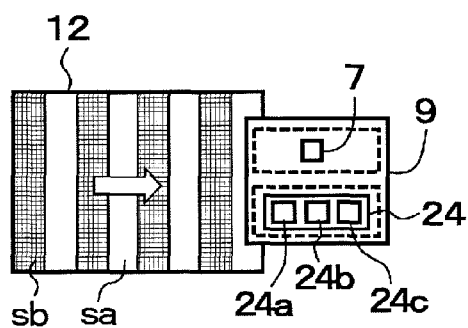
FIGS. 11A and 11B show an example of a configuration of a position detecting device of Example 3, and a simulation of outputs of a light receiving element.
Figure 11B:
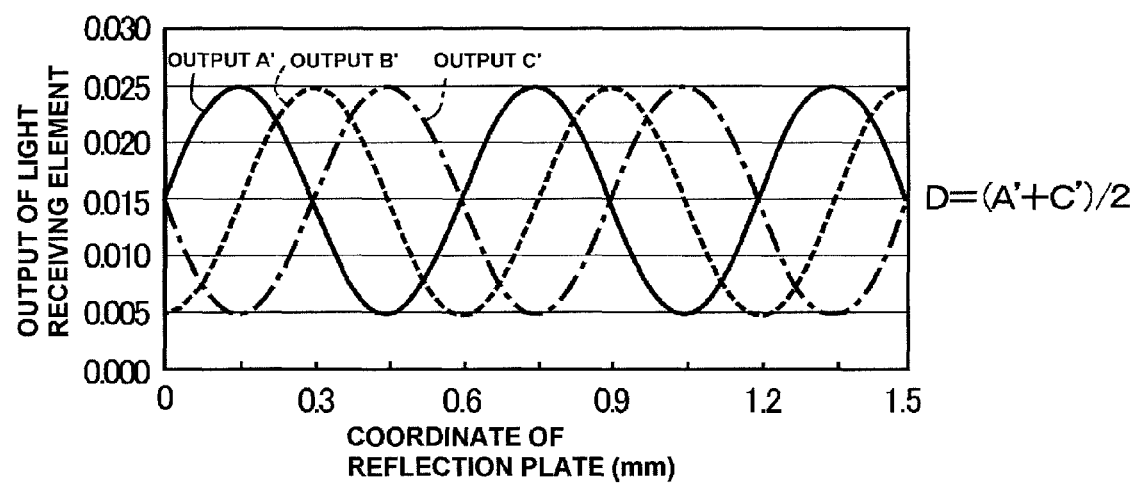

Example 3 is composed of the above-mentioned configuration, and according to such a configuration, the results shown in FIGS. 11A and 11B and FIGS. 12A and 12B can be obtained. Namely, in the configuration of Example 3 shown in FIG. 11A, the output A' is obtained from the light receiving portion 24a of the light receiving element 24, the output B' is obtained from the light receiving portion 24b and the output C' is obtained from the light receiving portion 24c as shown in FIG. 11B. These outputs form a waveform wherein a phase angle of the output B' is delayed by 90 degrees to the output A' (0 degree) and a phase angle of the output C' is delayed by 180 degrees to the output A' (0 degree). In the calculating means 26, the calculations of the linear values are carried out in the same manner as above using the outputs A to C which are obtained from the outputs A' to C' with the neutral potential being zero. Namely, the neutral potential D is calculated by the equation of D=(A'+C')/2 based on the outputs A' and C' in which there is a phase difference of 180 degrees between them, and the calculations of b=(A−B)/(A+B) and a=(A+B)/(A−B) are carried out in the same manner as in Example 1 based on the outputs A and B when the neutral potential is zero.

Figure 12A:
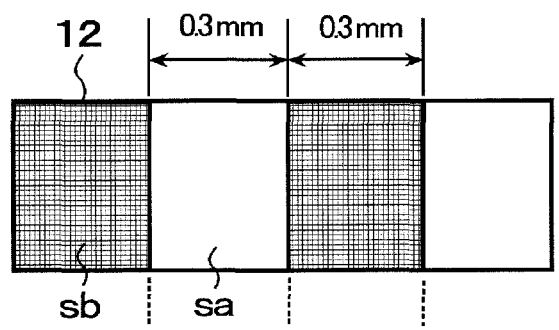
FIGS. 12A and 12B show a configuration of a reflection portion of a position detecting device of Example 3 and a simulation of outputs of a light receiving element and calculation outputs of linear values in relation to the reflection portion.
Figure 12B:
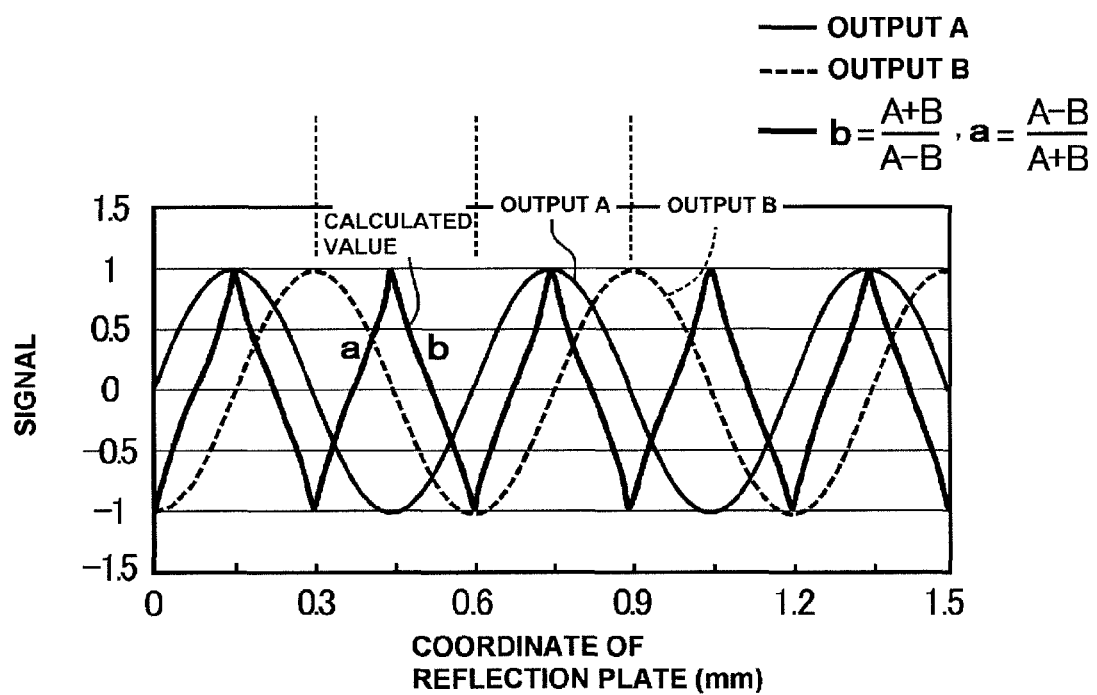

According to this calculation of the linear values, a triangular waveform in which ascending inclined parts "a" and descending inclined parts "b" both having linearity are repeated is obtained as shown in FIG. 12A. In Example 3, since the above-mentioned neutral potential D is calculated, there is an advantage such that even if a temperature change arises, the neutral potential (0 V in Example) in the calculation of a linear value does not fluctuate and is kept constant and an accurate calculation value is obtained, and the details thereof are explained infra. As explained in Example 1, according to the above-mentioned calculation equation, thermal property of the photosensor 9 can be canceled completely, and therefore, there is no need of providing a circuit for monitoring a temperature inside the device with a thermistor and carrying out feedback thereof or a specific thermal property canceling circuit.

Furthermore, as shown in FIG. 12A, in Example 3, the device is so designed that a width of the reflecting surface "sa" of the reflection plate 12 is 0.3 mm and a width of the non-reflecting surface "sb" is 0.3 mm and one cycle of the output signal waveform of the reflection type photosensor 9 is obtained by movement of 0.6 mm of the both. In other words, the movement of 0.6 mm can be detected by one cycle of the signal waveform.

Figure 13A:
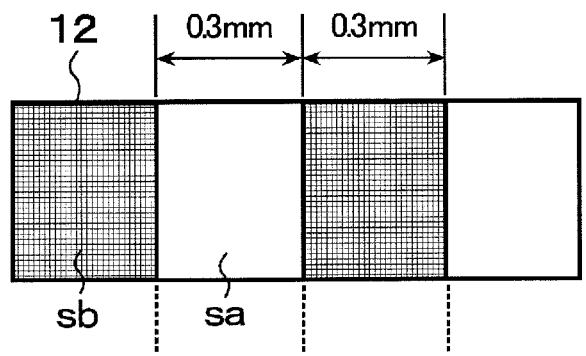
FIGS. 13A and 13B show a configuration of a reflection portion of a position detecting device of Example 3 and a relation of a position of the reflection portion with calculation outputs of linear values in the case of calculation of a phase angle of the reflection portion.
Figure 13B:
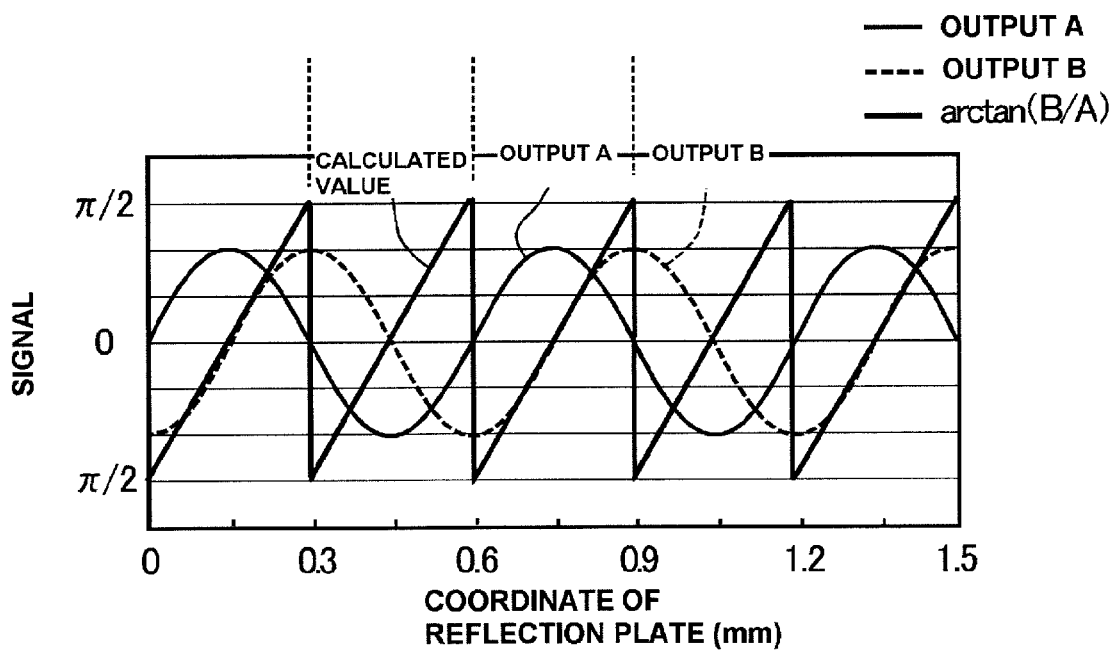

FIGS. 13A and 13B show the results of other calculation of linear values using the calculation equation for obtaining a phase angle "θ" of a signal with arctan(B/A). As mentioned above, for the calculation of linear values, there is a method of using θ=arctan(B/A), in which provided that a phase angle of an output signal is "θ", a moving distance of the reflection plate 12 moving at the side of the light emitting/light receiving surface of the photosensor 9 can be detected by determining a correlation of this "θ" to the position (coordinate) of the reflection plate 12.

This correlation of the "θ" to the coordinate of the reflection plate 12 is shown in FIG. 13B. In this Example, too, one cycle of the output signal waveform of the photosensor 9 is obtained by 0.6 mm movement of the reflection plate 12 comprising the 0.3 mm reflecting surface "sa" and the 0.3 mm non-reflecting surface "sb". In this case, since a relationship of 0.6 mm movement of the reflection plate 12=360 degrees of a phase angle of output signal is established, a position of the moving body can be detected by calculating this phase angle "θ".

Figure 14A:
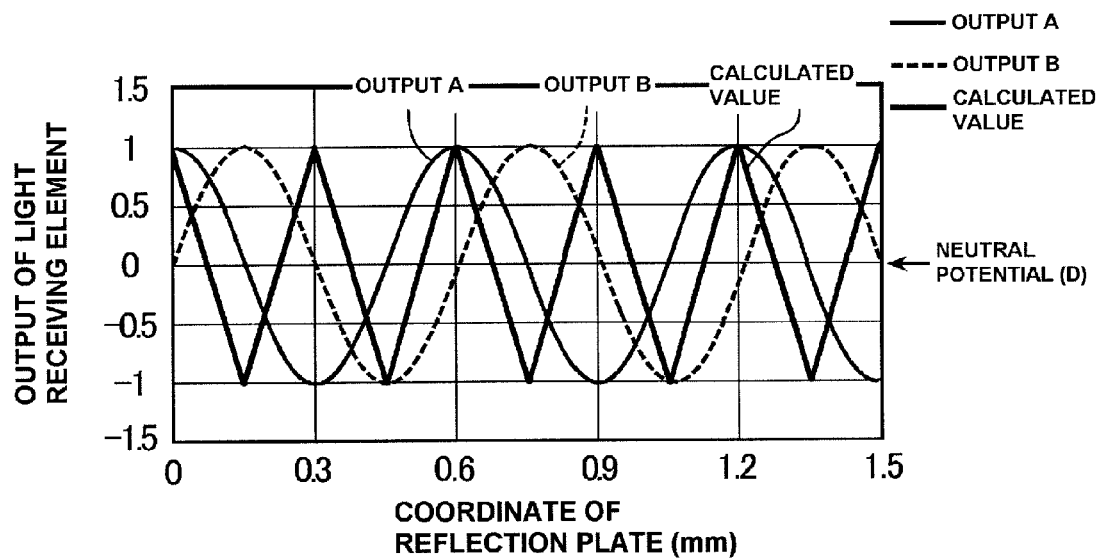
FIGS. 14A and 14B are graphs showing the results of calculation of a neutral potential with a position detecting device of Example 3 and the results in the case of the neutral potential being shifted.
Figure 14B:
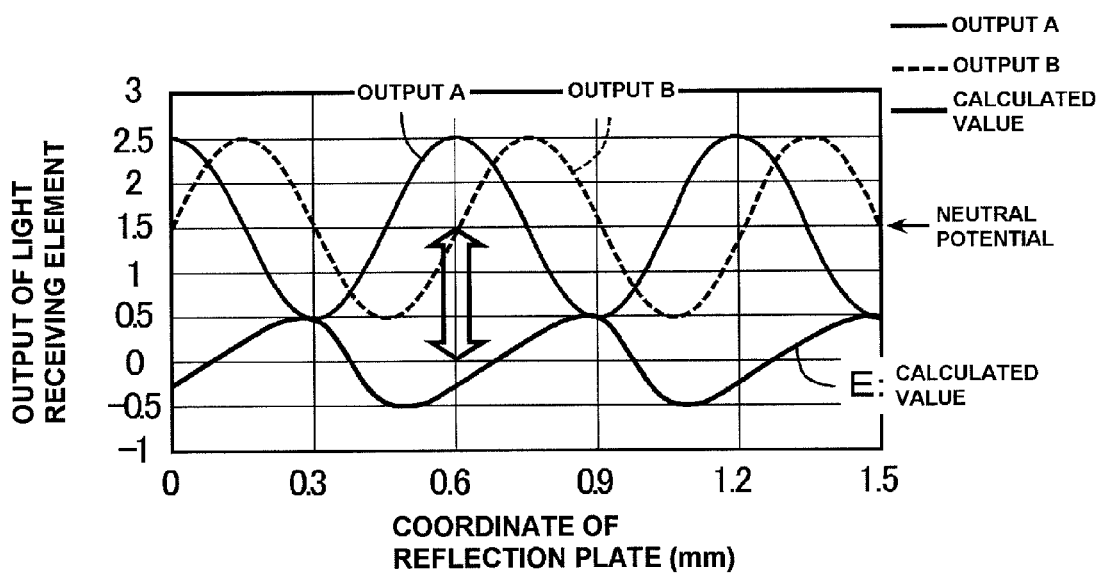
Figure 15A:
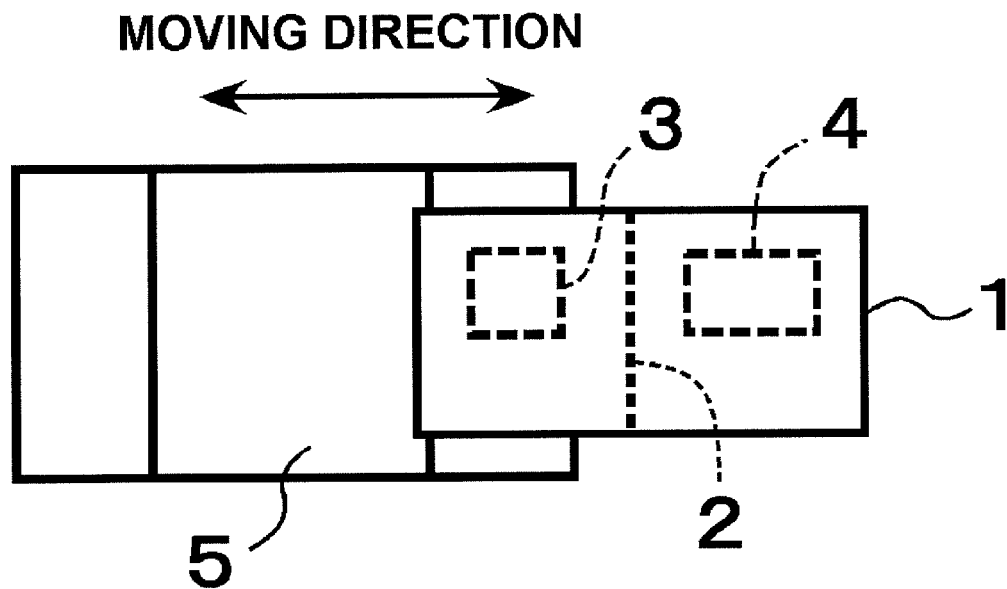
Figure 15B:
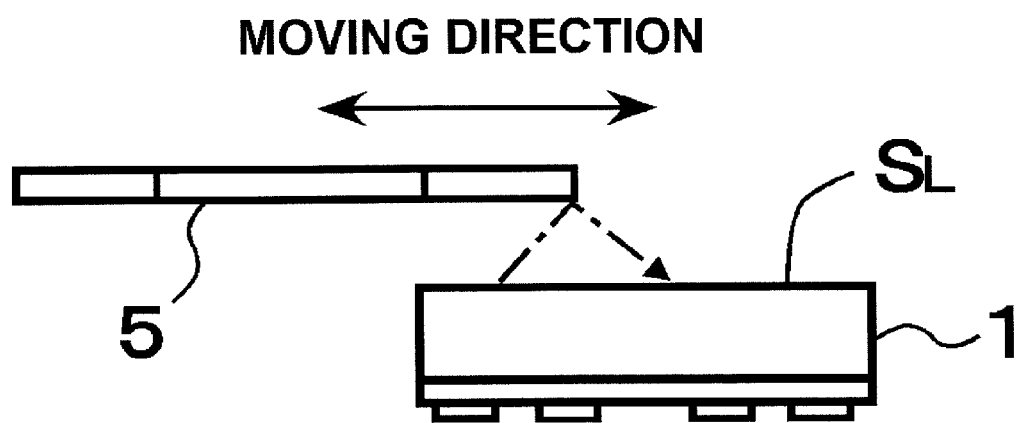

Next, an effect resulting from calculation of a neutral potential is explained by means of FIGS. 14A and 14B.

In the calculation of Example 3, a linear value is obtained from the calculation using the output signals A and B. However, the output signals A and B used in each calculation equation are not absolute values but relative values to the above-mentioned neutral potential D. In other words, in order to carry out the position detection by calculation of the above-mentioned linear values, the calculation must be carried out synchronously with procurement of each output voltage with a neutral potential of an output signal being always zero. Without doing so, linearity necessary for the position detection is deteriorated.

There is generally a difference in an output voltage of the reflection type photosensor 9 between the individual products, and the output voltage changes depending on bias conditions of the reflection type photosensor. Moreover, since sensors have temperature dependence, a value of a neutral potential D of output signals is not always constant. In order to always obtain an accurate neutral potential D, calculations of A=A'−D and B=B'−D may be carried out by monitoring amplifications of the output signals A' and B' with an external LSI or the like and calculating a value of a neutral potential D by an equation A'/2=B'/2=D using the monitored values. However, in the case where an abrupt temperature change, a bias fluctuation in the device, or the like arises due to any factor, there is a possibility that an accurate neutral potential D cannot be obtained depending on timing and for an instant, the result obtained from the calculated value shows a waveform getting out of shape as shown by E of FIG. 14B.

In FIG. 14B, the above-mentioned calculations of (A−B)/(A+B) and (A+B)/(A−B) are carried out in spite of a fluctuation of amplifications of the output signals within the inherent range of −1 to +1 to the range of 0.5 to 2.5 and shifting of the neutral potential to 1.5 V, and as a result, the calculated value of the waveform E is output. From this result, too, it is seen that if a value of a neutral potential D can be always monitored synchronously with the detection of the output signals A and B, it is good in order to always obtain stable linearity without generation of system breakdown.

FIG. 14A shows the result of the calculation of the neutral potential D. By this calculation of the neutral potential D, the neutral potential of the outputs A and B is always set at 0 V, and therefore, the calculation result shows a repeated triangular waveform having high linearity. Furthermore, in Examples, the output (signal) C is so designed to shift forward at a phase angle of 180 degrees to the output A, and therefore, D=(A+C)/2 which is a half of the sum of A and C always show the neutral potential D of each output signal irrespective of a fluctuation of the outputs A, B and C. In other words, while this calculation of the neutral potential D can be carried out by the calculation equation of D=(Amax−Amin)/2=(Bmax−Bmin)/2 as mentioned above, more accurate calculation of the neutral potential D is carried out by using A and C having a phase difference of 180 degrees. By carrying out the calculation of D=(A+C)/2 with the calculating means 26 based on the outputs A, B and C obtained at the same time, linearity can be always secured in the calculation of a linear value.

According to the above-mentioned Example 3, there is an advantage such that in the case of the photosensor 9 having temperature dependence, even if a neutral potential changes when a fluctuation of an output signal from the photosensor 9 arises due to an abrupt temperature change, it does not give an effect on linearity characteristic obtained from the calculation equation.

INDUSTRIAL APPLICABILITY

The position detecting device of the present invention can be applied to actuators and the like for long distance detection, for example, for a digital still camera, a single lens reflex camera, a camcorder, CCTV and the like requiring high power zooming function, as a position detecting device undergoing long distance detection with high resolution.

EXPLANATION OF SYMBOLS 1, 9 . . . Reflection type photosensor
3, 7 . . . Light emitting element
4, 8, 16, 17, 18, 24, 28 . . . Light receiving element
5, 12 . . . Reflection plate (reflection portion)
8a, 8b, 16a, 16b, 17a, 17b, 18a, 18b, 24a-24c, 28a-28c . . . Light receiving portion
14, 26 . . . Calculating means (micro processor unit)
19, 20 . . . Light-shielding reflection film
22 . . . Adding means
sa . . . Reflecting surface sb . . . Non-reflecting surface

What is claimed is:

1. A position detecting device, comprising:
a sensor for a position detecting device, comprising: a reflection portion, on which reflecting surfaces and non-reflecting surfaces are arranged alternately in a moving direction of a moving body, and a reflection type photosensor disposed opposite to the reflection portion and having a light emitting element for emitting light in the direction of the reflection portion and a light receiving element for receiving light reflected on the reflection portion, wherein the light receiving element of the reflection type photosensor is provided with a plurality of light receiving portions, each of which has respective different light receiving regions in the moving direction of the moving body;
a neutral potential conversion means for parallel shifting of output values obtained from two of the plurality of light receiving portions so that a neutral potential of the output values fluctuating due to a change of the position of the reflection portion becomes zero in a relation of the output values with the position of the reflection portion; and
a calculating means undergoing operation using the parallel shifted output values to linearize a relation of a value obtained by the operation with a position of the reflection portion,
wherein the two light receiving portions are formed so that a phase difference between output signals of the two light receiving portions becomes 90 degrees, and
provided that output values from the two light receiving portions shifted in parallel by the neutral potential conversion means are A and B and the output of the light receiving portion shifting forward by a phase difference of 90 degrees is A, the calculating means undergoes calculation of (A−B)/(A+B) when A≥0 and B≥0 or A<0 and B<0 and calculation of (A+B)/(A−B) when A≥0 and B<0 or A<0 and B≥0, or undergoes calculation of arctan (B/A).

2. The position detecting device according to claim 1, wherein the light receiving portions of the light receiving element of the reflection type photosensor are formed so as to give areas of the light receiving regions per unit length being larger from the center of the light receiving portion in the moving direction of the reflection portion toward both ends so that a detected output changes linearly according to a moving distance of the moving body, or the light emitting portion of the light emitting element is formed so as to give areas of the light emitting portions per unit length being larger from the center of the light emitting element in the moving direction of the reflection portion toward both ends so that a detected output changes linearly according to a moving distance of the reflection portion.

3. The position detecting device according to claim 2, further comprising a neutral potential calculating means for calculating the neutral potential the neutral potential calculating means adds the outputs of the two light receiving portions having a phase difference of 180 degrees,
wherein the plurality of the light receiving portions have a third light receiving portion which is formed so that a phase difference between the output of the third light receiving portion and the output of one of the two light receiving portions becomes 180 degrees and adding the outputs of the two light receiving portions having a phase difference of 180 degrees.

4. The position detecting device according to claim 1, further comprising a neutral potential calculating means for calculating the neutral potential the neutral potential calculating means adds the outputs of the two light receiving portions having a phase difference of 180 degrees,
wherein the plurality of the light receiving portions have a third light receiving portion which is formed so that a phase difference between the output of the third light receiving portion and the output of one of the two light receiving portions becomes 180 degrees and adding the outputs of the two light receiving portions having a phase difference of 180 degrees.

5. A position detecting method for detecting a position of a moving body, comprising:

fixing, to the moving body, a reflection portion, on which reflecting surfaces and non-reflecting surfaces having the same width are arranged alternately in a moving direction of the moving body, providing the reflection type photosensor having a light emitting element and a light receiving element opposite to the reflection portion, forming the light receiving element of the reflection type photosensor so as to have a plurality of different light receiving portions along the moving direction of the moving body, forming the plurality of different light receiving portions such that a phase difference between output signals from two of the plurality of light receiving portions becomes 90 degrees, and shifting, in parallel, output values obtained from two of the plurality of light receiving portions so that a neutral potential of the output values fluctuating due to a change of the position of the reflection portion becomes zero in a relation of the output values with the position of the reflection portion, wherein provided that output values from the two light receiving portions shifted in parallel by the neutral potential conversion means are A and B and the output of the light receiving portion shifting forward by a phase difference of 90 degrees is A, conducting calculation of $(A-B)/(A+B)$ when $A \geq 0$ and $B \geq 0$ or $A < 0$ and $B < 0$ and calculation of $(A+B)/(A-B)$ when $A \geq 0$ and $B < 0$ or $A < 0$ and $B \geq 0$, or conducting calculation of $\arctan(B/A)$.

* * * * *